United States Patent
Slifka

(10) Patent No.: US 10,629,186 B1
(45) Date of Patent: Apr. 21, 2020

(54) DOMAIN AND INTENT NAME FEATURE IDENTIFICATION AND PROCESSING

(71) Applicant: Amazon Technologies, Inc., Reno, NV (US)

(72) Inventor: Janet Louise Slifka, Cambridge, MA (US)

(73) Assignee: Amazon Technologies, Inc., Reno, NV (US)

( * ) Notice: Subject to any disclaimer, the term of this patent is extended or adjusted under 35 U.S.C. 154(b) by 665 days.

(21) Appl. No.: 13/793,856

(22) Filed: Mar. 11, 2013

(51) Int. Cl.
| | |
|---|---|
| G10L 15/00 | (2013.01) |
| G10L 15/18 | (2013.01) |
| G06F 17/27 | (2006.01) |
| G10L 15/183 | (2013.01) |

(52) U.S. Cl.
CPC ........ G10L 15/1815 (2013.01); G06F 17/278 (2013.01); G10L 15/1822 (2013.01); G06F 17/2785 (2013.01); G10L 15/183 (2013.01)

(58) Field of Classification Search
None
See application file for complete search history.

(56) References Cited

U.S. PATENT DOCUMENTS

| | | | |
|---|---|---|---|
| 6,446,035 B1* | 9/2002 | Grefenstette et al. | 704/1 |
| 2005/0192992 A1* | 9/2005 | Reed | G06Q 10/107 |
| 2005/0234723 A1* | 10/2005 | Arnold | G10L 15/183 |
| | | | 704/257 |
| 2007/0016401 A1* | 1/2007 | Ehsani et al. | 704/9 |
| 2008/0037720 A1* | 2/2008 | Thomson et al. | 379/88.01 |
| 2009/0326919 A1* | 12/2009 | Bean | 704/9 |
| 2010/0318356 A1* | 12/2010 | Hamaker et al. | 704/251 |
| 2011/0125503 A1* | 5/2011 | Dong | G10L 15/22 |
| | | | 704/275 |
| 2011/0173000 A1* | 7/2011 | Yamamoto et al. | 704/240 |
| 2012/0130705 A1* | 5/2012 | Sun et al. | 704/9 |
| 2012/0290300 A1* | 11/2012 | Lee | G09B 19/06 |
| | | | 704/235 |
| 2013/0346066 A1* | 12/2013 | Deoras et al. | 704/9 |
| 2015/0039292 A1* | 2/2015 | Suleman | G06F 17/289 |
| | | | 704/9 |

OTHER PUBLICATIONS

Zhang et al., "Domain Adaptation for Conditional Random Fields", AIRS 2008, LNCS 4993, p. 192-202, 2008.*

* cited by examiner

*Primary Examiner* — Richard Z Zhu
(74) *Attorney, Agent, or Firm* — Pierce Atwood LLP

(57) ABSTRACT

A system for improved natural language understanding (NLU) provides pre-feature input to a named entity recognition (NER) component. Pre-features may include no-textually derived information associated with the circumstances describing a user command (such as time, location, etc.). A domain and/or intent may also be determined prior to NER processing and may be passed to the NER component as an input. The pre-features and/or domain or intent information may assist the NER processing by providing context to a textual input, thereby improving NER processing such as semantic tagging, which in turn may improve overall NLU processing quality.

19 Claims, 6 Drawing Sheets

DOMAIN AND INTENT NAME FEATURE IDENTIFICATION AND PROCESSING

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with natural language processing techniques may allow a user to control a computing device to perform tasks based on the user's spoken commands. The combination of such techniques may be referred to as speech processing. Speech processing may also convert a user's speech into text data which may then be provided to various textual based programs and applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Speech processing systems are generally configured to be capable of processing a wide variety of speech inputs without necessarily being specially configured. As a result, because of the many different ways of interpreting textual input, systems that perform speech processing may involve processing incredibly large amounts of data, much of which is likely irrelevant to any particular input. To focus computational efforts, and improve the overall quality of speech processing results, a more informed method of domain and named entity recognition is offered.

A natural language processor takes a textual input (one provided either as the output from an automatic speech recognition (ASR) or from some other source) and performs named entity recognition (NER) on the textual input to identify and tag the meaningful portions of the text so that a later component may properly form a command to send to another application. To improve NER processing, additional information beyond the textual input may be provided to the NER processor ahead of time. Such information may be referred to as pre-features. Pre-features may describe any data that may assist natural language processing such as user identification, user preferences, typical user queries, etc. As described below, pre-features include features that are not derived from the text to be processed. Pre-features may be fed as inputs to an NER processor. Other inputs to the NER processor may include a domain (a category describing the context of the textual input) or an intent (an indicator of the intended command of a user to be executed by a device). While a domain and/or intent may typically be determined later in a natural language process, determining them before NER processing, and offering them as inputs to a NER processor, may improve overall natural language output. The domain and intent may be pre-features (that is, not derived from the text input itself) or may be derived from the text but still input into the NER processor.

Figure 1:
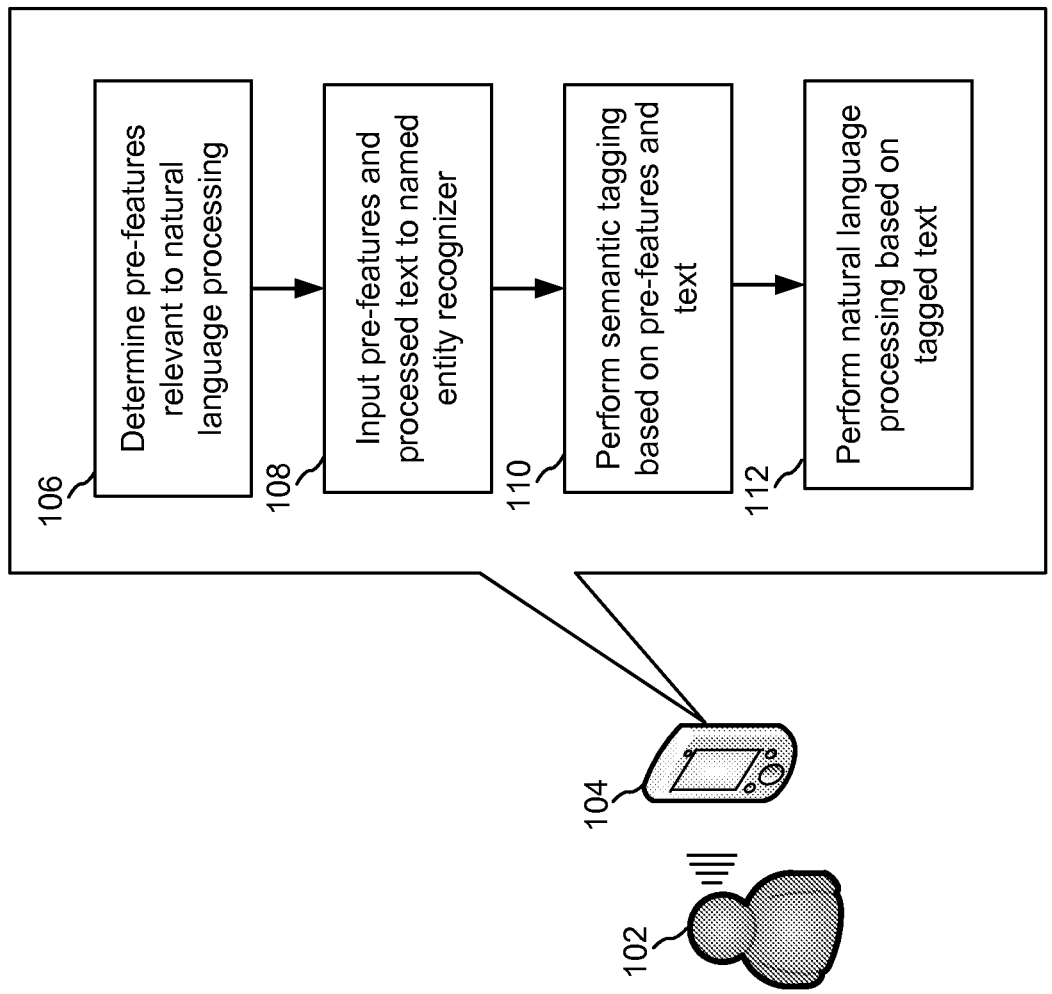
FIG. 1 illustrates a system for identifying domain and intent name features according to one aspect of the present disclosure.

FIG. 1 illustrates a system for identifying domain and intent name features according to one aspect of the present disclosure. Although FIG. 1 illustrates a user communicating with a single device, the aspects described herein may be performed by one or more devices which may be connected over a network or otherwise. A user 102 may speak a command to a device 104. The device may then perform ASR processing to convert the audio utterance into text. A number of pre-features describing the user, circumstances of the command, etc. may be determined to be relevant to natural language processing, as shown in block 106. The determination may be made prior to the command being spoken to the device. The relevant pre-features and text may be input to a named entity recognizer, as shown in block 108. The named entity recognizer may then perform semantic tagging, as shown in block 110. The device may then perform natural language processing based on the tagged text, as shown in block 112. These processes, and other aspects of the present disclosure, are further described in detail below.

Figure 2:
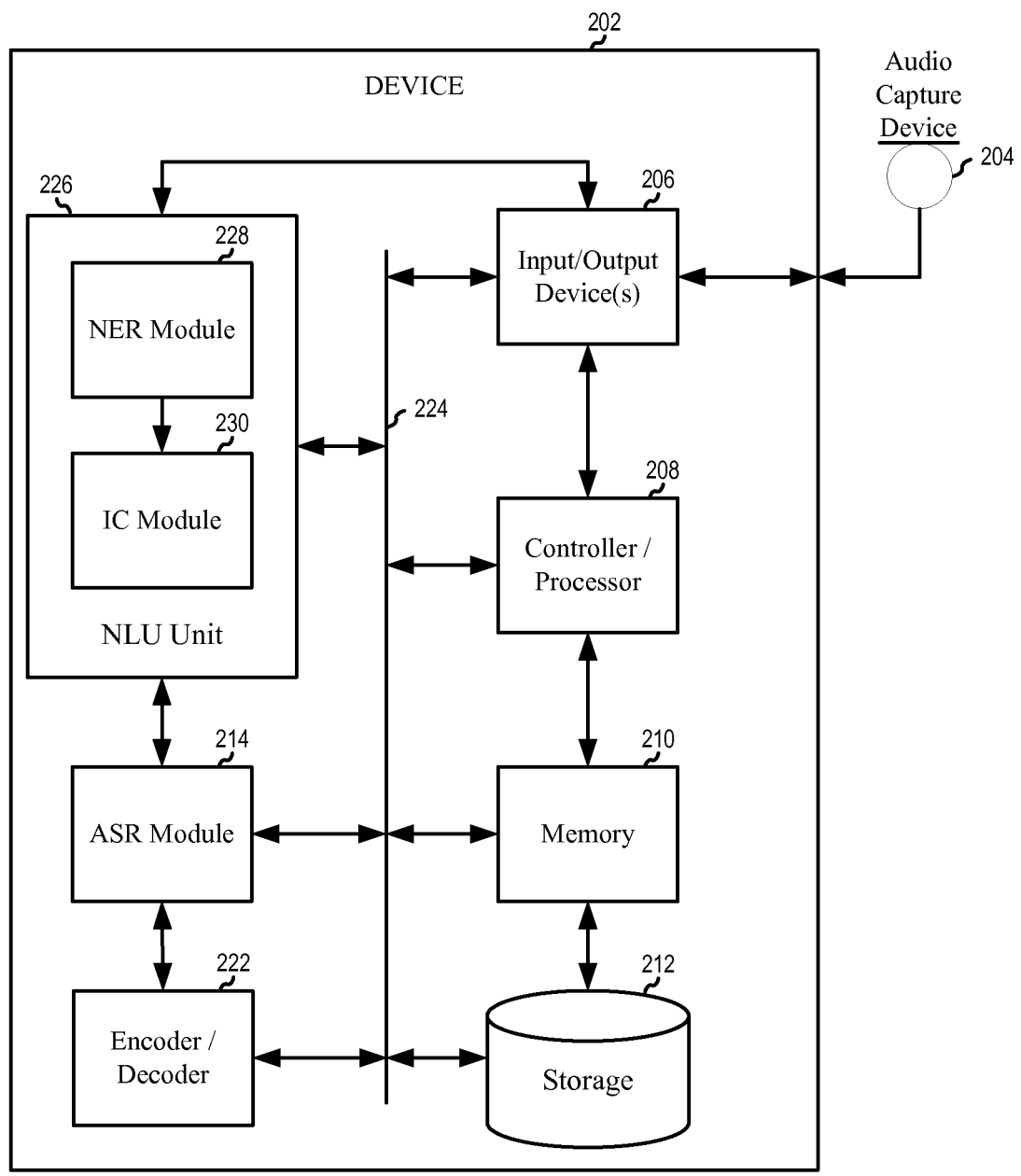
FIG. 2 is a block diagram conceptually illustrating a device for speech processing according to one aspect of the present disclosure.

FIG. 2 shows a speech processing device 202 for performing speech recognition. Aspects of the present disclosure include computer-readable and computer-executable instructions that may reside on the device 202. FIG. 2 illustrates a number of components that may be included in the device 202, however other non-illustrated components may also be included. Also, some of the illustrated components may not be present in every device capable of employing aspects of the present disclosure. Further, some components that are illustrated in the device 202 as a single component may also appear multiple times in a single device. For example, the device 202 may include multiple input/output devices 206 or multiple controllers/processors 208.

Multiple devices may be employed in a single speech processing system. In such a multi-device system, the devices may include different components for performing different aspects of the speech processing. The multiple devices may include overlapping components. The device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The device 202 may also be a component of other devices or systems that may provide speech processing functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the device 202 may include an audio capture device 204 for capturing spoken utterances for processing. The audio capture device 204 may include a microphone or other suitable component for capturing sound. The audio capture device 204 may be integrated into the device 202 or may be separate from the device 202. The device 202 may also include an address/data bus 224 for conveying data among components of the device 202. Each component within the device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208 and/or the NLU unit 226).

The device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The device 202 may also include a data storage component 212, for storing data and instructions. The data storage component 212 may include one or more storage types such as magnetic storage, optical storage, solid-state storage, etc. The device 202 may also be connected to removable or external memory and/or storage (such as a removable memory card, memory key drive, networked storage, etc.) through the input/output device 206. Computer instructions for processing by the controller/processor 208 for operating the device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device(s) 206 the device 202 may connect to a network, such as the Internet or private network, which may include a distributed computing environment.

The device may also include an automatic speech recognition (ASR) module 214 for processing spoken audio data into text. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list with corresponding probability scores.

The ASR module 214 may be connected to the bus 224, input/output device(s) 206, encoder/decoder 222, controller/processor 208, NLU unit 226, and/or other component of the device 202. Audio data sent to the ASR module 214 may come from the input/output device 206, such as audio data captured by a local device and sent to the device 202 over a network.

The ASR module 214 may include an acoustic front end (AFE) and a speech recognition engine. The AFE transforms audio data into data for processing by the speech recognition engine. The speech recognition engine compares the speech recognition data with the acoustic, language, and other data models and information for recognizing the speech contained in the original audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The speech recognition engine may process the output from the AFE with reference to information stored in speech storage. Alternatively, post front-end processed data (such as feature vectors) may be received by the ASR module 214 from another source besides the internal AFE. For example, another entity, such as a local device, may process audio data into feature vectors and transmit that information to the device 202 through the input/output device 206 or across a network interface which may be part of the input/output device 206. Feature vectors may arrive at the device 202 encoded, in which case they may be decoded (for example by the encoder/decoder 222) prior to processing by the speech recognition engine The speech recognition engine attempts to match received feature vectors to language phonemes and words as known in the speech storage. The speech recognition engine computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the ASR module 214 to another component of the device 202 or to the input/output device 206 for sending to an external device. For example, ASR results in the form of a textual representation of the speech, an N-best list, lattice, etc. may be sent to a natural language understanding (NLU) unit 226 for natural language processing, such as conversion of the text into commands for execution.

The NLU unit 226 may include a dedicated NLU engine, processor, memory, storage, named entity recognition (NER) module 228, intent classification (IC) module 230, and/or other components, and/or may use components otherwise available on the device 202. The NLU unit takes the textual output of ASR processing and attempts to make a semantic interpretation of the ASR result. That is, the NLU unit determines the meaning behind the text based on the individual words and then implements that meaning. The NLU unit interprets a text string (such as the text output by the ASR module 214) to derive an intent or a desired action from the user as well as the pertinent pieces of information in the text that let allow the device 202 to complete that action. For example, if a spoken utterance is processed by an ASR module and outputs the text "call mom" the NLU unit will determine that the user intended to activate a telephone in his/her device and to initiate a call with a contact matching the description "mom." The NLU may be configured to annotate text as part of NLU processing. For example, for the text "call mom," "call" may be annotated as a command (to execute a phone call) and "mom" may be annotated as a target of the command (and the telephone number for "mom" in a contact list may be included in the annotation). To correctly perform NLU processing of speech input the NLU may be configured to communicate with a variety of other components/applications of a device such as a phone, contact list, calendar, music player, etc.

The NLU processing is based on the models and programming available to the NLU unit. Such models may be grammar based, rule based or constructed in a different manner. The NLU may store a training corpus that may include precoded text and/or the corresponding commands that go with the text, that may be used to train and improve the models used by the NLU unit 226 in natural language understanding. The training corpus may be used to train the NLU models, which may then be used during NLU processing.

In this manner the NLU may initiate instructions to other components/applications of a device in order to perform actions the NLU believes have been commanded by a user. NLU processing may be performed by a local device or by a remote device. If performed by a remote device, the remote device may then send instructions to a local device to perform operations based on the NLU results.

Figure 3:
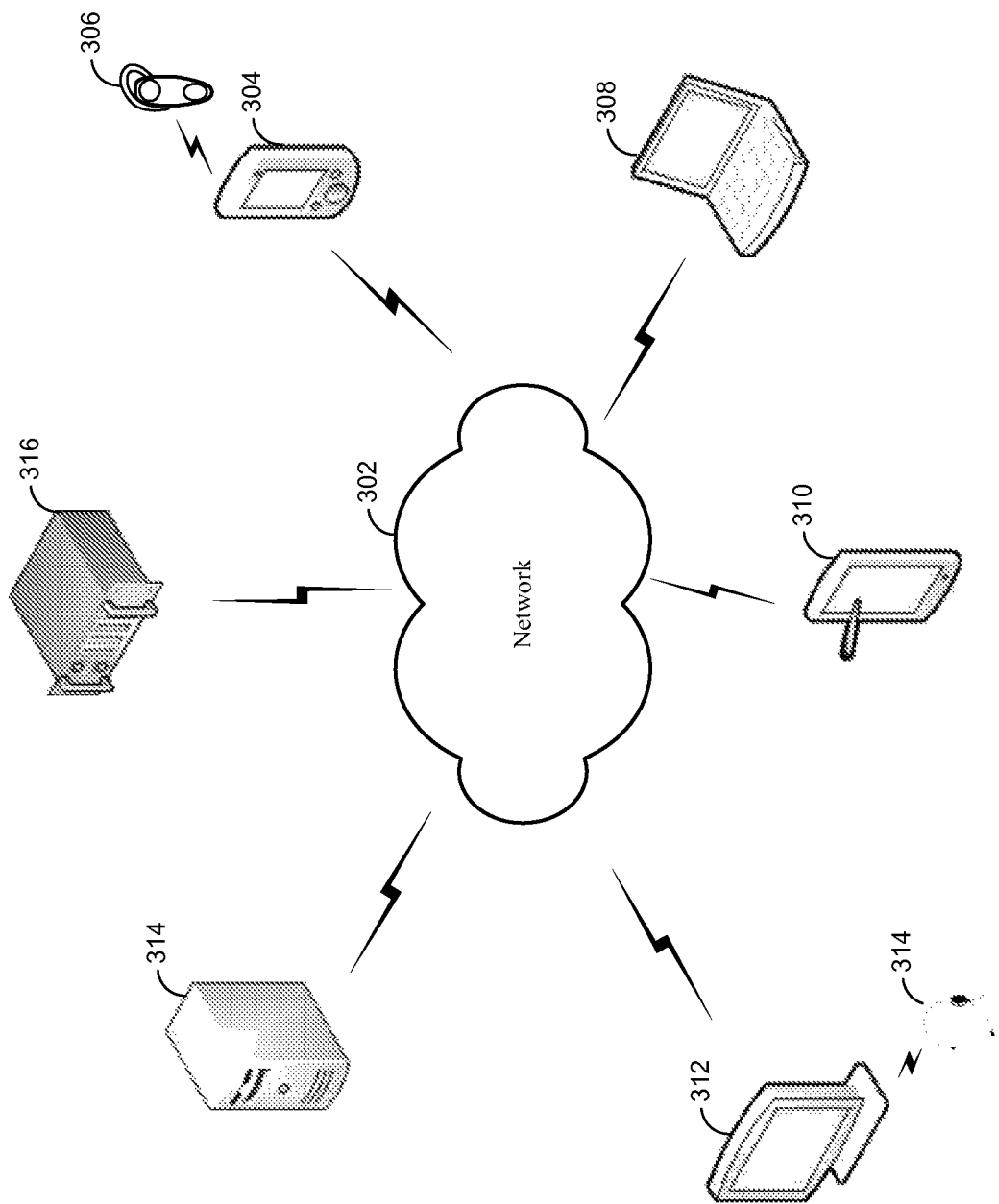
FIG. 3 illustrates a computer network for use with distributed speech processing according to one aspect of the present disclosure.

As shown in FIG. 3, multiple devices may be connected over a network 302. Network 302 may include a local or private network or may include a wide network such as the internet. Devices may be connected to the network 302 through either wired or wireless connections. For example, a wireless device 304 may be connected to the network 302 through a wireless service provider. Other devices, such as computer 312, may connect to the network 302 through a wired connection. Other devices, such as laptop 308 or tablet computer 310 may be capable of connection to the network 302 using various connection methods including through a wireless service provider, over a WiFi connection, or the like. Networked devices may input spoken audio through a number of audio input devices including through headsets 306 or 314. Audio input devices may be connected to networked devices either through a wired or wireless connection. Networked devices may also include embedded audio input devices, such as an internal microphone (not pictured) in laptop 308, wireless device 304 or table computer 310.

In certain speech processing system configurations, one device may capture an audio signal and other device(s) may perform the speech processing. For example, audio input to the headset 314 may be captured by computer 312 and sent over the network 302 to computer 314 or server 316 for processing. Or computer 312 may partially process the audio signal before sending it over the network 302. In another aspect, the speech capture, ASR, and NLU processing may all be performed on different devices. Because speech processing may involve significant computational resources, in terms of both storage and processing power, such split configurations may be employed where the device capturing the audio has lower processing capabilities than a remote device and higher quality results are desired. The audio capture may occur near a user and the captured audio signal sent to another device for processing.

An NLU unit 226 may receive a wide variety of textual inputs that should result in a wide variety of executed commands. For example, a user may instruct a device to "call mom" to activate a phone program and start a call to a contact labeled "mom", "play poker" to activate a poker game program, "what is the weather today" to activate device locating data, cross reference that with weather data and display the weather data to a user and/or activate a weather application, etc. Further, an NLU unit 226 may receive two very similar textual inputs that should result in different executed commands. For example, a textual input of "play the rolling stones" may result in the NLU unit 226 generating commands for a device to activate a music playing program and beginning playing a playlist called "the rolling stones" (or begin playing selections of the artist "Rolling Stones"). The same textual input, however, may also result in the NLU unit 226 generating commands for a device to activate a game application called "The Rolling Stones." To assist in accurately processing a received input, the NLU unit 226 may perform semantic labeling/tagging of received text.

Semantic tagging is a process of recognizing and identifying specific important words of an NLU textual input and assigning a tag to those words, where the tag is a classification of the associated word. The tags may be called entities or named entities. This process may also be referred to as named entity recognition (NER). For example, for a command of "play some stones" the word "play" may be associated with a "PlayTrigger" tag and the word "stones" may be associated with an "ArtistName" tag. The word "some" may be considered less important, thus not considered for a named entity and may not receive a tag or may be given a catchall or default tag such as "Unknown" or "DontCare." An NLU unit 226 may include a NER module 228 to perform this labeling process. The NER module 228 may use computing components (such a controller/processor, memory, storage, etc.) associated with the NLU unit 226, with the device 202 generally, or may use computing components specifically associated with the NER module 228. The tags may be used by the NLU unit 226 or later components to assist in executing the command indicated by the text.

The NER module 228 receives the textual input, compares the input with its available models and determines the tags to associate with each word. The models available to the NER module 228 may be based on training data which include samples of input text and their corresponding semantic tags. The NER models may rely on a variety of inputs to the model, called features, which determine how specific words in a textual input may be classified. Example features include direct textual data (i.e., the word of the text itself) as well as features which may be derived from/based on the text (such as words used to the right or left of the subject word, location of the word in a sentence structure, grammatical information such as a word's part of speech (noun, preposition, verb, etc.)). For example, if the NER module 228 is processing the word "stones" and it knows that the word directly previous to "stones" is "rolling" it may be more likely to apply the tag "ArtistName" to the word "stones."

A NER model may be constructed using techniques such as hidden Markov models, maximum entropy models, log linear models, conditional random fields (CRF), and the like. For example, an NER model may compute a score that a word is associated with a particular tag by computing an inner product of a feature vector for that word with another vector for the tag. The tag assigned to the word may correspond to the highest score, and tags assigned to other words may also be considered. The NER module 228 takes the textual input and related features and compares them to the available models and other information to determine the likely tags to associate with each word of the input text. For each input word the NER module 228 may determine a list of potential tags to associate with the word, where each potential tag has an associated score representing the likelihood that a particular tag should be associated with the respective word. The tag with the highest score may be chosen and output by the NER module 228, or the NER module 228 may output an N-best list of potential tags and/or their respective scores.

Typically, a NER model is configured to accept any textual input that may be received. That is, the NER module 228 will typically apply a generalized model that is not necessarily skewed toward one potential input type or another as the NER module 228 generally will not have any clues ahead of time as to the subject of the input text and is thus generally ready to process any textual input as it arrives. Thus, the NER module 228 will be prepared to apply all different kinds of tags and select any different kind of domain at any point in time. As a general rule, the more training information that is available to the NER model, the better the NER module 228 will perform in correctly tagging input text and correctly choosing the appropriate domain. For the generalized NER model, which may have hundreds or thousands of potential tags and/or domains, the training data volume may be significant.

Figure 4A:
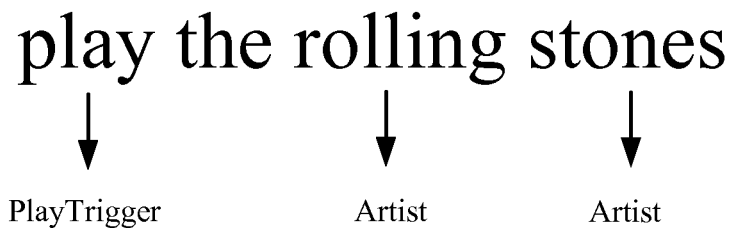
FIGS. 4A-4C illustrate semantic tagging according to various aspects of the present disclosure.
Figure 4B:
Figure 4C:
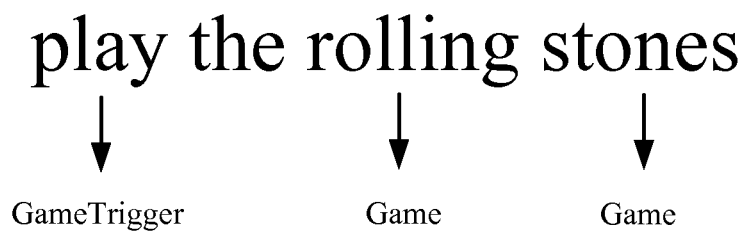

FIGS. 4A-4C illustrate semantic tagging according to various aspects of the present disclosure. Specifically, FIGS. 4A-4C illustrate tagging of the same textual input "play the rolling stones" in three different ways. In the examples of FIG. 4, a NER module 228 may have information which indicates that The Rolling Stones is the name of an artist associated with certain songs stored on a user's device, a playlist of songs on a user's device, a game on a user's device, etc. FIG. 4A illustrates the NER module 228 tagging the textual input as a request to play the artist The Rolling Stones. The word "play" is tagged with the tag "PlayTrigger" which indicates the word is a command (trigger) to play certain music. The words "rolling" and "stones" are tagged with the tag "artist" which indicates the words are part of an artist name. FIG. 4B illustrates the NER module 228 tagging the textual input as a request to play the playlist The Rolling Stones. The word "play" is tagged with the tag "PlayTrigger" which indicates the word is a command (trigger) to play certain music. The words "rolling" and "stones" are tagged with the tag "playlist" which indicates the words are part of a playlist name. FIG. 4C illustrates the NER module 228 tagging the textual input as a request to play the game The Rolling Stones. The word "play" is tagged with the tag "GameTrigger" which indicates the word is a command (trigger) to play a certain game. The words "rolling" and "stones" are tagged with the tag "game" which indicates the words are part of a game name. In the examples shown in FIGS. 4A-4C the word "the" is not tagged as the NER module 228 determines that that specific word is not related to the executable command and is therefore not tagged or may be tagged with a default tag such as "Default." Such a default tag may ease later processing by allowing the system to expect that each word is associated with a tag and to process the words and tags accordingly. The compiled tags of the various tagging options illustrated in FIGS. 4A-4C may then ultimately be used to execute the commands as interpreted by the NLU unit 226. In another example, the NLU unit 226 may receive a different textual input such as "when is my meeting about the Rolling Stones?" In this example the word "when" may receive a tag such as "QueryTrigger," the word meeting may receive a tag such as "Calendar," and the words "Rolling" and "Stones" may each receive a tag such as "MeetingName."

While the NER module 228 attempts to interpret the incoming text to perform semantic tagging and domain identification in a consistent manner, the NER module 228 may output a tag for one word in a sentence that may not make sense with another word in the sentence. For example, the NER module 228 may apply a "PlayTrigger" tag in the same sentence as a "MeetingName" tag, even though the two tags may not necessarily make sense together. The NER module 228 also generally has little knowledge of the later use of the applied tags. For example, the NER module 228 may not know that whether the "PlayTrigger" applies to an intent for playing a radio station or for playing voice memos. Similarly, the NER module 228 does not undertake steps to determine the overall meaning of the input text, that is it does not attempt to identify the user's intent in the textual statement or what actions should be taken as a result of receiving the particular textual input. The NER module 228 is focused on applying tags to the input text. The NER module 228 typically leaves the determination of a user's intent, and ultimate commands for realizing that intent, for later components.

For example, following processing by the NER module 228, parsed and tagged text may be passed to an intent classification (IC) module 230. The IC module identifies an intent associated with a particular textual input. The intent is a classification that generally represents the command of the textual input. Sample intents may include "PlayMusic," "QueryCalendar," "NewCalendarItem," "GetDirectionsto-Location," or the like. The IC module 230 may use computing components (such a controller/processor, memory, storage, etc.) associated with the NLU unit 226, with the device 202 generally, or may use computing components specifically associated with the IC module 230. The IC module 230 receives the tagged textual input and compares that input with its known models to determine the intent to associate with a particular text input. An IC model may be constructed as a classifier and use techniques such as a support vector machine, and the like. For each input text section the IC module 230 may determine a list of potential intents to associate with the text, where each potential intent has an associated score representing the likelihood that a particular intent should be chosen. The intent with the highest score may be chosen and output by the IC module 230, or the IC module 230 may output an N-best list of potential tags and/or their respective scores.

In addition to determining intent, an IC module 230 may also identify a domain for a particular textual input. A domain is larger category describing the textual input. Sample domains may include calendar, music, games, communication (e.g., email, texting, etc.), queries, etc. Each domain may be associated with one or more applications associated with a user's device. Choosing a domain may assist the NLU unit 226 with executing the correct commands most closely associated with the user's intent when speaking a command.

As an example, if an IC module 230 received the following text and domain input (where each word is represented in the following manner "word/tag"):

"Play/<PlayTrigger>the Rolling/<Artist>Stones/<Artist>"

Domain: Music the IC module 230 may calculate a high score that the intent is PlayArtist but a very low score that the intent is CreateMeeting (or similarly unlikely intents) and therefore may select an intent of PlayArtist.

In another example, the importance of the tagging to the intent classification may be illustrated. If a user speaks a command into a device "Get some Rolling Stones," the NLU unit 226 may process that input in a number of different ways, such as a request to play music, purchase concert tickets, etc. The NER module 228, which is typically trained on all input text and potential domains, may apply some internally inconsistent semantics tags, which may create difficulties for the IC module 230. For example, if the IC module 230 received the following input:

"Get/<PlayTrigger>some Rolling/<Artist>Stones/<Artist>"

Domain: Music the IC module 230 may likely interpret the intent as "PlayArtist" and may construct a command for a music player to play music by the artist Rolling Stones. And if the IC module 230 received the following input:

"Get/<CommerceTrigger>some Rolling/<Item>Stones/<Item>"

Domain: Purchasing the IC module 230 may likely interpret the intent as "BuyItem" and may construct a command to initiate a transaction to purchase concert tickets. However, if the IC module 230 received the following input:

"Get/<CommerceTrigger>some Rolling/<Artist>Stones/<Artist>"

Domain: Music the IC module 230 may have difficulty determining whether the intent should be "PlayArtist" or "BuyItem" and may calculate very close scores between the two, which may lead to errors in overall NLU processing as the ultimate output may not match the user's intent when speaking the command.

One drawback to the approach described above is that a NER module 228 is generally unaware of the context of the input text prior to undertaking NER processing or other information external to the text being processed. The input to the NER module 228 is typically simply the text or features determined based on the text. To improve the overall quality of NLU processing, offered is a system to provide improved NER processing by providing it with some contextual data, called pre-features, prior to performing semantic tagging. As described below, the pre-features may include a variety of information, including the domain and/or intent, which would typically be calculated after NER processing. Further, a NER module 228 may be provided with multiple models with which to perform NER processing. The multiple models may be trained on the various pre-features to provide more particularized, and potentially higher quality, output tagged text.

Figure 5:
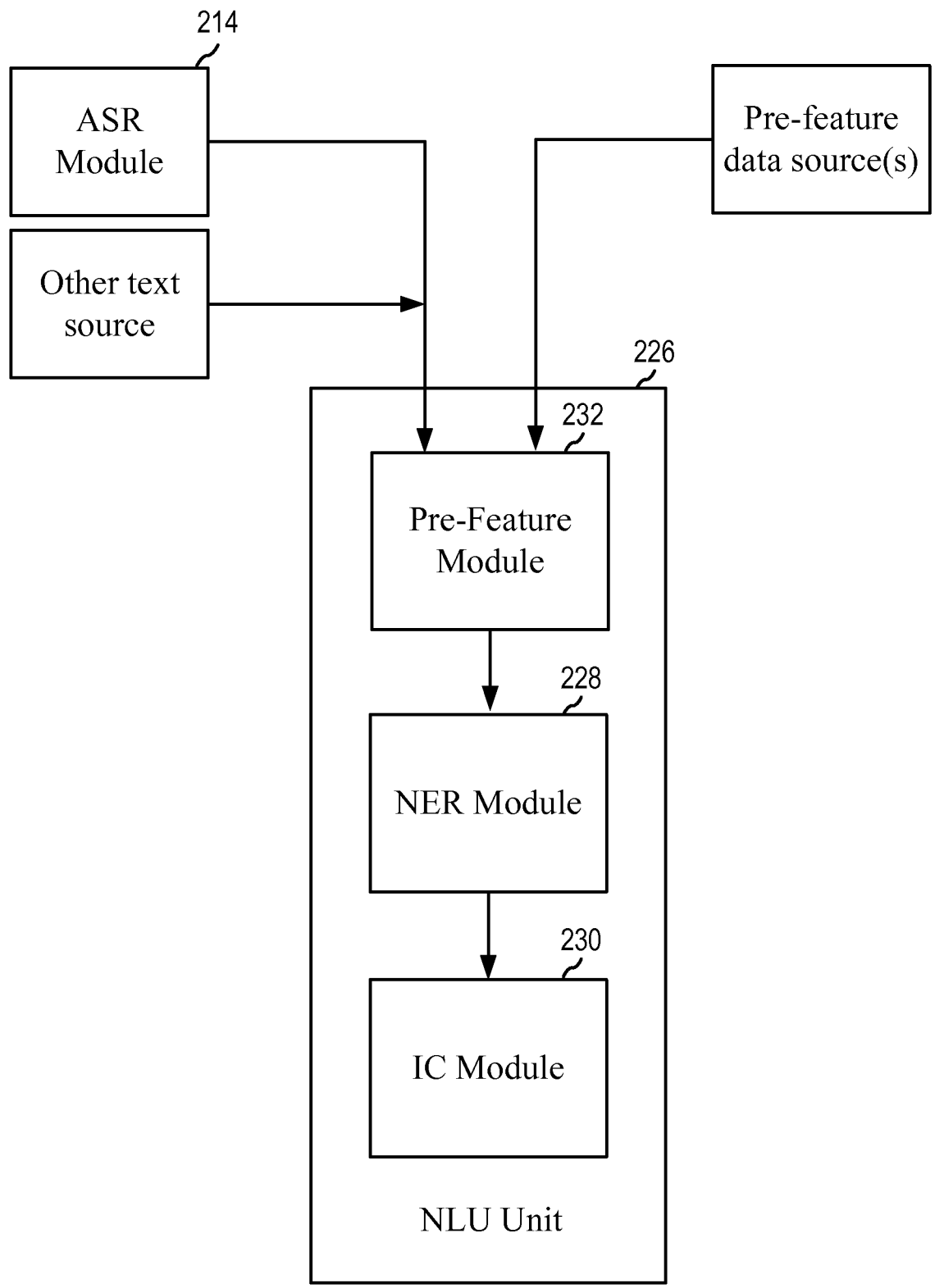
FIG. 5 illustrates a natural language processing unit according to one aspect of the present disclosure.

To determine what additional information beyond the input text is sent to the NER, a pre-feature module may be included in the NLU unit 226. An example of an NLU unit 226 with such a module is shown in FIG. 5. A pre-feature module 232 may be configured within the NLU unit 226. The pre-feature module 232 may use computing components (such a controller/processor, memory, storage, etc.) associated with the NLU unit 226, with the device 202 generally, or may use computing components specifically associated with the pre-feature module 232. The pre-feature module may receive textual input for NLU processing from the ASR module 214 or from some other component of a device 202. The pre-feature module 232 may also receive pre-feature data from a variety of input sources.

Pre-feature data is information that may be used in natural language processing which is not based on the textual input. Such pre-feature data may include a user's location, previous actions performed by a user, the content of a user's device, the temperature surrounding a device, the time of day, etc. Any information available to the device which is not derived from the text may be considered pre-feature data. Textually derived information includes information that is determined based on the text input. For example, if the text input is "play some rolling stones", the information of PlayTrigger and ArtistName as obtained from the text would be considered textually derived. As described below, pre-feature data may include a variety of different kinds of information which may assist NLU processing. The pre-feature module 232 may pass to the NER module 228 direct textual features (such as the words of the text), features derived from the input text (such as the position of words in the text, grammatical information, etc.) and features not derived from the text (such as user information, location, or other factors discussed below).

Pre-feature data may include user specific information, such as the identity of the user and/or the device 202, which may include the identity of the specific user or the identity of known users of the particular device from which the textual input originated. The identity information may be linked to other information such as user operational history, that is information regarding the user's previous interactions with the device including previous commands received from the user. For example, if a particular user regularly asks a device to play music from a group of three musical artists, that information may be provided to the pre-feature module 232 to inform the overall NLU processing. The user information may be even more specific. For example, if a particular user regularly asks to listen to music from a specific artist during the morning hours and a different artist during the evening hours, that information may also be included as pre-feature data. Other pre-feature user data may include the content of a user's music catalog, a device's available applications, a user's calendar entries and/or contacts, and the like. The user data may be specific to a particular user or may be aggregated with data from other users which may also be useful, such as knowing that a large population of users in a certain geographic location are querying devices for weather information.

Pre-feature data may also include physical context information such as user/device location (such as geographic location or location category (work v. home, etc.)), time of day, calendar information (including date, season, time of year, etc.), weather data, device type (phone v. television, etc.), and the like. This information may be correlated to user specific data to inform NLU processing, such as knowing that a particular user regularly asks to listen to Christmas music during the later months of the year, but only when the weather is cold. Still other pre-feature data may include the volume of the user's speech input, the speed of the user's speech input, the relative noise surrounding the user, and other physical context information which may be used to determine a particular context that may inform NLU processing (such as a user emergency, a user in a social situation, etc.). Many other variations of non-textual pre-feature data may also be considered as part of the NLU processing.

The presence of certain pre-features may be communicated from the pre-feature module 232 to the NER module 228 through a pre-feature vector. The pre-feature vector is a 1×N data structure, where N is the number of pre-features to be communicated. The pre-feature vector may be configured based on whatever desired pre-features are to be considered during NLU processing. For each pre-feature that is present, a value is set in the vector corresponding with the particular pre-features. The pre-feature vector may call for binary values (such as 1=yes, or 0=no) or for other values. For example, a pre-feature vector may be defined to consider the following pre-features:

[Device Time; Is Device Speed Above 15 mph; Is user male; Last called contact]

If for a particular incoming text input the device time was 6:43 a.m., the user was driving in a car going 30 miles per hour, the user was female and had most recently called a contact entitled "mom," the completed pre-feature vector may be illustrated as:

[06:43; 1; 0; mom]

Although a small pre-feature vector was illustrated, the pre-feature vector may be very large to account for a large number of pre-features that may be desired to be communicated to the NER module 228. The pre-feature vectors may also be used as part of the training data available to the NER module, with each particular training example also associated with a corresponding pre-feature vector, indicating which pre-features were present in the training examples. In one aspect, the pre-feature module 232 may include one or more models which may be used to determine which set of pre-features and/or configuration of pre-feature vector to pass to an NER module 228. The desired set of pre-features may depend upon the context of the received text and pre-processing that may be performed by the pre-feature module 232. In this aspect, the pre-feature module may also pass to the NER module 228 an indicator of the set of pre-features being passed to the NER module 228 such as a vector configuration identifier or the like.

One or more NER models may be trained on various combinations of pre-feature data. That is, a NER model may include not only samples of input text and their corresponding semantic tags, but also different pre-feature data combinations that may occur with the different textual inputs. For example, if pre-feature data includes information that a user typically listens to music in the morning but plays games in the evening, the textual command "Play the Stones" may be trained differently in a NER model depending on whether the text is accompanied by pre-feature data indicating the time is the morning or the time is the evening. Specific training of models to accommodate pre-feature data may result in improved NLU processing performance.

In one aspect, a pre-feature module 232 may be configured to determine the domain of a textual input or a list of possible domains and corresponding probabilities for those domains. The pre-feature module 232 may use domain models to determine a domain of a textual input prior to semantic tagging that may be performed by a NER module 228. The determined domain may then be passed to the NER module 228 as an input along with the textual data and pre-feature data. The NER module 228 may then use the determined domain to potentially perform more accurate semantic tagging, leading to improved NLU results. In another aspect, the pre-feature module 232 may be configured to determine the intent of the textual input prior to semantic tagging that may be performed by a NER module 228. The determined intent may then be passed to the NER module 228 as an input along with the textual data, pre-feature data and/or domain data. In another aspect the pre-feature module 232 may pass an N-best list of domains and/or intents along with their respective probabilities to the NER module 228. The NER module 228 may then incorporate the domain and intent results, N-best list(s) and/or the corresponding scores in the list(s) in the semantic tagging process.

The domain and intent of a textual input may be considered along with the pre-features which may be passed as an input to the NER module 228. The domain and/or intent may be determined by the pre-feature module 232 based on the available models as well as the pre-feature data, such as the type described above, which may be available to the pre-feature module 232. In one aspect the domain and intent may be pre-features, that is derived from non-textual information. In this aspect the domain and intent may be derived from a variety of pre-feature like information, such as the user location, previous user command(s) to a device, time of day, user content on the device, and many other kinds of information. In another aspect the domain and intent may be textually derived, and thus not considered pre-features, but may nonetheless be determined prior to NER processing and thus passed as an input to the NER module 228. In another aspect both textual and non-textual information may be combined to determine the domain and/or intent prior to passing the domain and/or intent to the NER module 228. In another aspect, the NER module 228 may be configured with multiple specialized NER models which the NER module 228 may employ rather than a generalized NER model. The specialized models may be configured for particular domains and/or intents. For example, if a pre-feature module 232 determines that the domain for a particular textual input is "Music," the NER module 228 may use a special music model to tag the input text. This may result in improved NLU results. Many different specific models may be trained and made available to the NER based on different potential domains and/or intents. In another aspect the NER module 228 may perform multiple passes of a textual input based on received N-best list(s) of domains and/or intents from the pre-feature module 232. The NER module 228 may then output an N-best list of tagged semantic text for further processing by a device 202 or NLU unit 226. In another aspect, the NER module 228 may be configured with multiple user-specific models. The user-specific models may be unique models for individual users or may be models configured specifically for user types such as users who are verbose, users who are terse, or the like. The pre-feature module 232 may indicate the existence of a particular feature describing the user (either by user identity or by user category). The NER module 232 may then activate a particular NER model based on the pre-feature data passed to it by the pre-feature model.

The NER module 232 may then take the input text and pre-feature data and performs semantic tagging to output tagged text. The tagged text may then be passed to an IC module 230 (if appropriate in the particular configuration of the NLU unit 226) or to another module for configuring the tagged text into an appropriate format for ultimate execution by the appropriate application to which the input text command should be directed.

Figure 6:
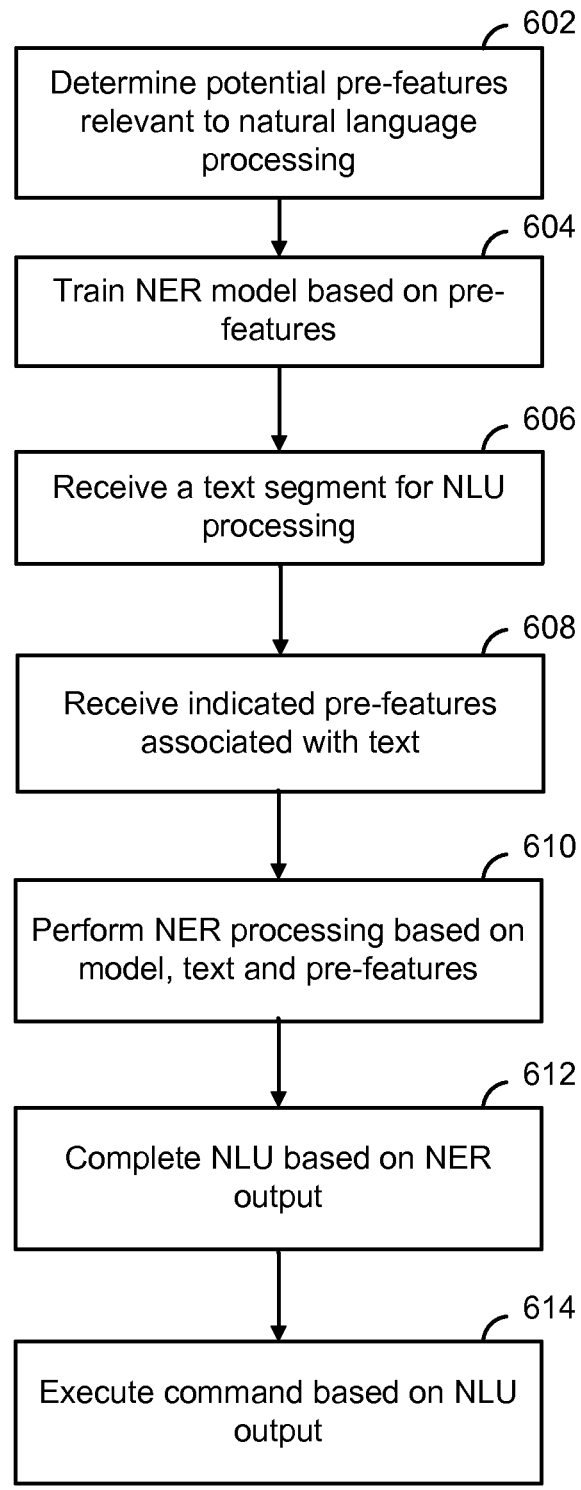
FIG. 6 illustrates a method for identifying domain and intent name features according to one aspect of the present disclosure.

In one aspect of the present disclosure, a speech processing system may identify domain and intent name features, and perform natural language processing as shown in FIG. 6. A system may determine potential pre-features relevant to natural language processing, as shown in block 602. The system may then train one or more NER models based on the pre-features, as shown in block 604. The steps shown in blocks 602 and 604 are generally performed in advance and are not typically repeated for each text section processed. Once the NER module 232 is configured, the system then may receive a text section for natural language understanding (NLU) processing, as shown in block 606. The text section may correspond to a user spoken utterance for which ASR processing has been performed to arrive at the text section. The system may receive pre-features which are associated with the text section, as shown in block 608. The system may then perform NER processing based on the trained model, the text section and the received pre-features associated with the text section, as shown in block 610. Following the NER processing the system may complete additional NLU processing, as shown in block 612 and/or take additional steps to effectuate execution of the user's command, as shown in block 614.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the speech recognition techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method of performing natural language processing, the method comprising:
   receiving an audio signal comprising an utterance;
   obtaining first text of the utterance using automatic speech recognition;
   determining at least one of a category of commands or a potential intent corresponding to the utterance, wherein the at least one of the category or the potential intent are determined using data associated with the utterance and are not determined from the first text or based on a previous utterance that is associated with the utterance;
   performing semantic tagging of the first text using a named entity recognition model based at least in part on at least one of the category or the potential intent, wherein the named entity recognition model was trained using a corpus of data comprising a first training text, and wherein the first training text was associated with at least one of a first category or a first intent;
   determining, using the results of the semantic tagging, a selected intent for the utterance; and
   performing an action using the selected intent.

2. The method of claim 1, wherein the named entity recognition model comprises a conditional random field.

3. The method of claim 1, wherein the category comprises at least one of a calendar category, a music category, a games category, or a communications category.

4. The method of claim 1, wherein performing semantic tagging is further based at least in part on one or more of the following: a user identity, a user location, a user activity history, a time associated with the utterance, information stored on a user device, or a device type.

5. The method of claim 1, wherein the selected intent comprises at least one of a play music intent, create calendar item intent, or a get directions to location intent.

6. The method of claim 1, further comprising performing further natural language understanding processing based at least in part on the results of the semantic tagging.

7. The method of claim 1, wherein the determining at least one of the category of commands or the potential intent is based at least in part on at least one of: a user identity, a user location, a time associated with the utterance, a date associated with the utterance, a volume associated with the utterance, a speech speed associated with the utterance, ambient noise associated with the utterance, information stored on a user device, or a device type.

8. A computing device, comprising:
at least one processor;
a memory device including instructions operable to be executed by the at least one processor to perform a set of actions, configuring the at least one processor:
to receive audio data corresponding to an input utterance of a user;
to perform automatic speech recognition (ASR) on the audio data to obtain text;
to determine one or more pre-features, wherein the one or more pre-features are data associated with the input utterance and are not determined from the text or based on a previous input utterance of the user;
to associate the one or more pre-features with the text;
to determine, based at least in part on the one or more pre-features, at least one of a category of commands corresponding to the input utterance or a potential intent corresponding to the input utterance, the potential intent corresponding to an intended command to be executed;
to generate a pre-feature vector including the one or more pre-features;
to associate an entity with at least one word of the text based at least in part on the pre-feature vector and the category or the intent; and
to determine, based at least in part on the entity, a selected intent for the input utterance.

9. The computing device of claim 7, wherein the at least one processor is further configured:
to select a named entity recognition model based on the category or the potential intent; and
to associate the entity with the at least one word of the text based at least in part on the one or more pre-features and the selected named entity recognition model.

10. The computing device of claim 8, wherein the one or more pre-features includes a user location.

11. The computing device of claim 8, wherein the one or more pre-features includes a user activity history.

12. The computing device of claim 8, wherein the one or more pre-features includes a user identity.

13. The computing device of claim 8, wherein the at least one processor is further configured to determine the one or more pre-features based at least in part on at least one of: a user identity, a user location, a time associated with the input command, a date associated with the input command, a volume associated with the input command, a speech speed associated with the input command, ambient noise associated with the input command, information stored on a user device, or a device type.

14. A non-transitory computer-readable storage medium storing processor-executable instructions for controlling a computing device, comprising:
program code to receive audio data corresponding to an input utterance of a user;
program code to perform automatic speech recognition (ASR) on the audio data to obtain text;
program code to determine one or more pre-features, wherein the one or more pre-features are data associated with the input utterance and are not determined from the text or based on a previous input utterance of the user;
program code to associate the one or more pre-features with the text;
program code to determine, based at least in part on the one or more pre-features, at least one of a category of commands corresponding to the input utterance or a potential intent corresponding to the input utterance, the potential intent corresponding to an intended command to be executed;
program code to generate a pre-feature vector including the one or more pre-features;
program code to associate an entity with at least one word of the text based at least in part on the pre-feature vector; and
program code to determine, based at least in part on the entity, a selected intent for the input utterance.

15. The non-transitory computer-readable storage medium of claim 14, further comprising:
program code to select a named entity recognition model based on the category or the potential intent based at least in part on the one or more pre-features, and
program code to associate the entity with the at least one word of the text based at least in part on the one or more pre-features and the selected named entity recognition model.

16. The non-transitory computer-readable storage medium of claim 14, wherein the one or more pre-features includes a time associated with the text.

17. The non-transitory computer-readable storage medium of claim 14, wherein the one or more pre-features includes information stored on a user device.

18. The non-transitory computer-readable storage medium of claim 14, wherein the one or more pre-features includes a device type.

19. The non-transitory computer-readable storage medium of claim 14, further comprising program code to determine the one or more pre-features based at least in part on at least one of: a user identity, a user location, a time associated with the input command, a date associated with the input command, a volume associated with the input command, a speech speed associated with the input command, ambient noise associated with the input command, information stored on a user device, or a device type.

* * * * *